United States Patent
Kaneko et al.

(10) Patent No.: US 7,206,691 B2
(45) Date of Patent: Apr. 17, 2007

(54) INTERNAL COMBUSTION ENGINE KNOCK DETERMINATION DEVICE

(75) Inventors: Rihito Kaneko, Nishikamo-gun (JP); Kenji Kasashima, Nishikamo-gun (JP); Masatomo Yoshihara, Toyota (JP); Kenji Senda, Okazaki (JP); Kouzi Ohara, Nukata-gun (JP); Kiyoshi Iwade, Okazaki (JP); Shuhei Oe, Kariya (JP); Yuichi Takemura, Anjo (JP); Shigeru Kamio, Nagoya (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 0 days.

(21) Appl. No.: 11/313,741

(22) Filed: Dec. 22, 2005

(65) Prior Publication Data

US 2006/0142925 A1 Jun. 29, 2006

(30) Foreign Application Priority Data

Dec. 24, 2004 (JP) ............................. 2004-373948

(51) Int. Cl.
*G06F 19/00* (2006.01)
*G01L 23/22* (2006.01)

(52) U.S. Cl. ..................................... 701/111; 73/35.04

(58) Field of Classification Search ................ 701/111; 73/35.02, 116, 35.04, 117.3; 123/406.12, 123/406.56, 406.13
See application file for complete search history.

(56) References Cited

U.S. PATENT DOCUMENTS

| 4,316,440 A * | 2/1982 | Yamaguchi et al. ....... 73/35.09 |
| 4,895,121 A * | 1/1990 | McCoy et al. ......... 123/406.13 |

FOREIGN PATENT DOCUMENTS

| FR | 2765623 | 1/1999 |
| JP | 01-092624 | 4/1989 |
| JP | 04-076249 | 3/1992 |
| JP | 05-125991 | 5/1993 |
| JP | 05-195869 | 8/1993 |
| JP | 06-272607 | 9/1994 |
| JP | 11-229951 | 8/1999 |
| JP | 2001-227400 | 8/2001 |
| JP | 2003-021032 | 1/2003 |
| JP | 2004-251218 | 9/2004 |
| JP | 2004-353531 | 12/2004 |

* cited by examiner

*Primary Examiner*—Hieu T. Vo
(74) *Attorney, Agent, or Firm*—Kenyon & Kenyon LLP (57) ABSTRACT

An engine ECU executes a program including a step of calculating a knock intensity N as based on comparing a waveform detected as a waveform of a vibration attributed to knocking with a knock waveform model stored in a memory as a waveform of a vibration attributed to knocking for crank angles except for crank angles where a magnitude of a vibration not attributed to knocking is greater than a predetermined magnitude, a step of determining that the engine knocks if knock intensity N is larger than a predetermined reference value, and a step of determining that the engine does not knock if knock intensity N is not larger than a predetermined reference value.

16 Claims, 7 Drawing Sheets

INTERNAL COMBUSTION ENGINE KNOCK DETERMINATION DEVICE

This nonprovisional application is based on Japanese Patent Application No. 2004-373948 filed with the Japan Patent Office on Dec. 24, 2004, the entire contents of which are hereby incorporated by reference.

BACKGROUND OF THE INVENTION

1. Field of the Invention

The present invention relates to a knock determination device and particularly to a knock determination device for an internal combustion engine that determines based on a waveform of a vibration of an internal combustion engine whether the engine knocks.

2. Description of the Background Art

Conventionally, a technique for detecting knocking of an internal combustion engine is known. Japanese Patent Laying-Open No. 2001-227400 discloses a knock control device for an internal combustion engine that can accurately determine whether the engine knocks. The knock control device for an internal combustion engine disclosed in Japanese Patent Laying-Open No. 2001-227400 includes a signal detector detecting a signal representing a waveform of vibration occurring in an internal combustion engine (or a vibration waveform signal), a occurrence period detector detecting a period as an occurrence period during which the vibration waveform signal detected by the signal detector takes on a value of at least a predetermined value, a peak position detector detecting a peak position in the occurrence period detected by the occurrence period detector, a knock determiner determining whether the internal combustion engine knocks based on the relationship between the occurrence period and the peak position, and a knock controller controlling an operation state of the internal combustion engine in accordance with a determination result of the knock determiner. The knock determiner determines knock (knocking) occurs when the peak position relative to the occurrence period is in a predetermined range.

According to the knock control device for an internal combustion engine disclosed in the publication, a signal representing a waveform of vibration occurring in an internal combustion engine is detected by a signal detector. An occurrence period during which the vibration waveform signal takes on a value of at least a predetermined value and a peak position therein are detected by an occurrence period detector and a peak position detector, respectively. Thus, the knock determiner is allowed to determine whether the engine knocks by detecting the position of the peak in the occurrence period of the vibration waveform signal. According to the knock determination result, the operation state of the internal combustion engine is controlled. When the peak position relative to the occurrence period is in a predetermined range, that is, when a waveform is shown in such a shape that the peak position appears earlier relative to a predetermined length of the occurrence period of the vibration waveform signal, the knock determiner recognizes it as being particular to knocking. Thus, even in a transition state where an operation state of the internal combustion engine abruptly changes or when electric loads are turned on/off, whether or not the internal combustion engine knocks is accurately determined, and the operation state of the internal combustion engine can be controlled appropriately.

However, while the engine knocks, a vibration that is greater in magnitude than a vibration attributed to knocking may sometimes be detected as noise. That is, in some cases a vibration attributed to a fault of a knock sensor or attributed to a vibration of the internal combustion engine itself may be greater in magnitude than a vibration attributed to knocking. In such cases, with the knock control device for an internal combustion engine of Japanese Patent Laying-Open No. 2001-227400, there has been a problem that the engine is erroneously determined as not knocking while the engine actually knocks, based on the fact that the peak position relative to the occurrence period is not within a predetermined range.

SUMMARY OF THE INVENTION

An object of the present invention is to provide a knock determination device that can determine whether the engine knocks with high precision.

A knock determination device for an internal combustion engine according to the present invention includes: a first magnitude detector detecting a magnitude of a vibration of the internal combustion engine at a first frequency band; a second magnitude detector detecting a magnitude of a vibration of the internal combustion engine at a second frequency band that is different from the first frequency band; a crank angle detector detecting a crank angle of the internal combustion engine; a waveform detector detecting a waveform of a vibration of the internal combustion engine at predetermined crank angle intervals as based on the magnitude of the vibration at the first frequency band; a storage storing in advance a waveform of a vibration of the internal combustion engine; and a determiner determining whether the internal combustion engine knocks, as based on a result of comparing the detected waveform with the stored waveform as well as on the magnitude of the vibration at the second frequency band.

According to the present invention, a magnitude of a vibration of a first frequency band (for example, a frequency band of a vibration attributed to knocking) and that of a second frequency band (for example, a frequency band of a vibration not attributed to knocking) are detected. A vibration waveform of the internal combustion engine is detected based on the magnitude of the vibration of the first frequency band. The detected waveform is compared with a knock waveform model stored in advance as a waveform of a vibration attributed to knocking, to determine whether the engine knocks. The detected vibration waveform is compared with the knock waveform model at a timing where the magnitude of the vibration at the second frequency band is smaller than a predetermined value. Thus, the detected waveform can be compared with the knock waveform model at a timing where noise due to the vibration of the second frequency band is small. This can prevent the engine from being erroneously determined as knocking due to the presence of great noise of a vibration not attributed to knocking, despite the engine not knocking. Furthermore, this can also prevent the engine from being erroneously determined as not knocking despite the engine knocking, based on a fact that a vibration not attributed to knocking has occurred at a timing different from a timing (crank angle) where the engine knocks. As a result, a knock determination device that can determine whether the engine knocks with high precision can be provided.

Preferably, the determiner determines whether the internal combustion engine knocks, as based on a result of comparing the detected waveform with the stored waveform at a timing where the magnitude of the vibration at the second frequency band is smaller than a predetermined magnitude.

According to the present invention, the detected waveform can be compared with the knock waveform model at a timing where the noise due to the vibration at the second frequency band is small. This can prevent the engine from being erroneously determined as knocking due to the presence of great noise of a vibration not attributed to knocking, despite the engine not knocking. Furthermore, this can also prevent the engine from being erroneously determined as not knocking despite the engine knocking, based on the fact that a peak value of a vibration is present at a timing (crank angle) that is different from a timing where the engine knocks. As a result, whether the engine knocks can be determined with high precision.

Further preferably, the first frequency band is a frequency band of a vibration attributed to knocking, and the second frequency band is a frequency band of a vibration not attributed to knocking.

According to the present invention, the detected waveform can be compared with the knock waveform model at a timing where the noise due to a vibration not attributed to knocking is small. This can prevent the engine from being erroneously determined as knocking despite the engine not knocking, due to the presence of great noise of a vibration not attributed to knocking. Furthermore, this can also prevent the engine from being erroneously determined as not knocking despite the engine knocking, based on a fact that a peak value of a vibration is present at a timing (crank angle) that is different from a timing where the engine knocks. As a result, whether the engine knocks can be determined with high precision.

Further preferably, the first frequency band does not include a resonance frequency of the internal combustion engine.

According to the present invention, a vibration waveform of the internal combustion engine can be detected not including a vibration of a resonance frequency of the internal combustion engine that occurs regardless of knocking. Thus, a waveform of a vibration attributed to knocking can be detected with high precision.

Further preferably, the second frequency band is narrower than the first frequency band.

According to the present invention, noise of other frequency bands' vibrations that may be included in the vibration of the second frequency band may be suppressed.

Further preferably, the second frequency band is a frequency band of a vibration attributed to actuation of an intake valve and an exhaust valve provided to a cylinder of the internal combustion engine.

According to the present invention, as a magnitude of a vibration not attributed to knocking, a magnitude of a vibration attributed to actuation of intake and exhaust valves provided to a cylinder of the internal combustion engine can be detected.

Further preferably, the second frequency band is a frequency band of a vibration attributed to actuation of a pump supplying fuel to an injector provided to the internal combustion engine.

According to the present invention, as a magnitude of a vibration not attributed to knocking, a magnitude of a vibration attributed to actuation of a pump can be detected.

Further preferably, the second frequency band is a frequency band of a vibration attributed to actuation of an injector provided to the internal combustion engine.

According to the present invention, as a magnitude of a vibration not attributed to knocking, a magnitude of a vibration attributed to actuation of an injector can be detected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
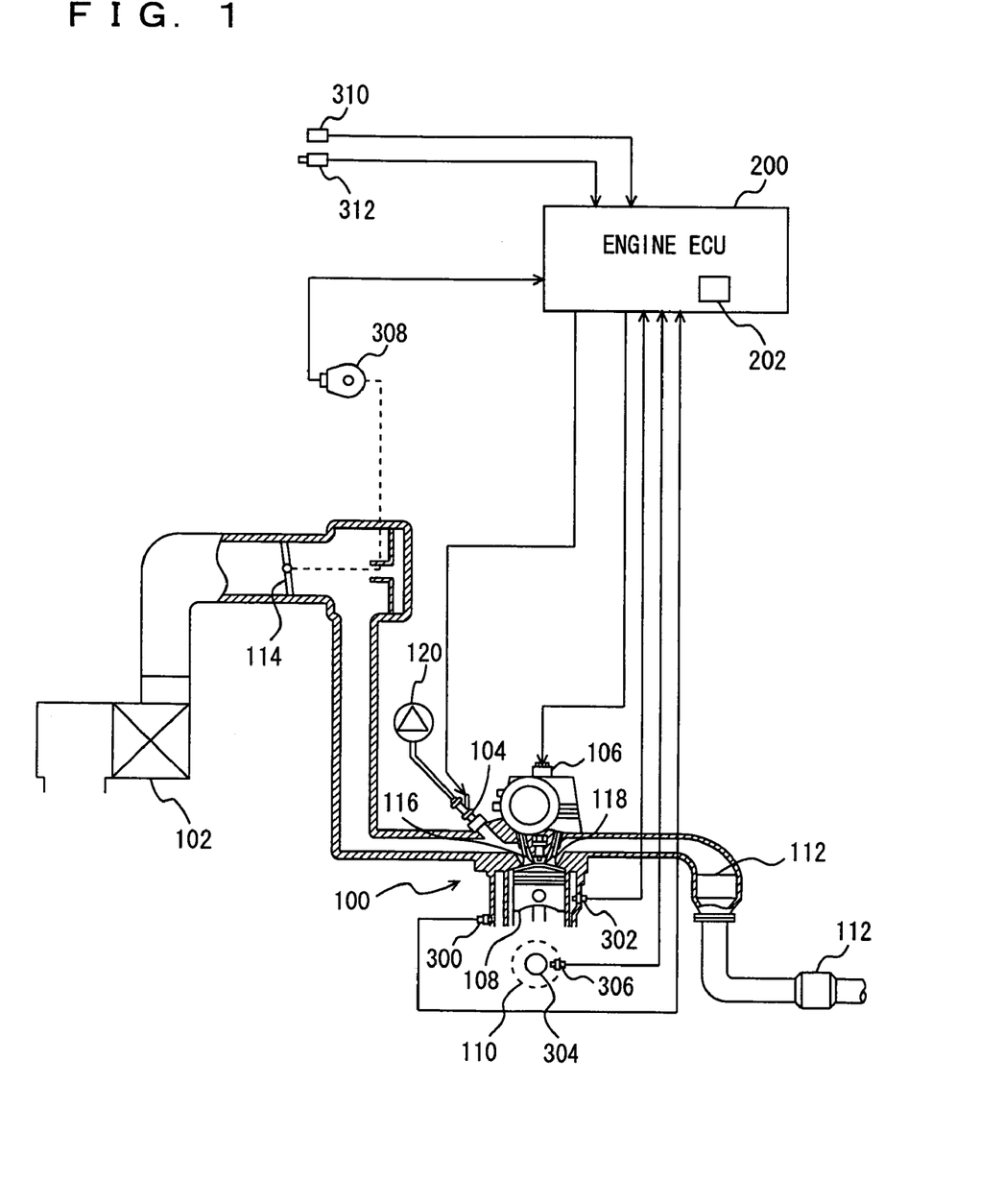
FIG. 1 is a schematic configuration diagram showing an engine controlled by a knock determination device according to an embodiment of the present invention.

With reference to FIG. 1, an engine 100 of a vehicle incorporating a knock determination device according to an embodiment of the present invention will be described. The knock determination device according to the present embodiment is implemented by a program executed by an engine ECU (Electronic Control Unit) 200, for example.

Engine 100 is an internal combustion engine that allows a mixture of air aspirated through an air cleaner 102 and a fuel injected by an injector 104 to be ignited in a combustion chamber by a spark plug 106 and thus combusted.

The air-fuel mixture combusted causes combustion pressure which presses a piston 108 down and a crank shaft 110 rotates. The combusted air-fuel mixture (or exhaust gas) is purified by a three-way catalyst 112 and thereafter discharged outside the vehicle. Engine 110 aspirates an amount of air adjusted by a throttle valve 114.

Engine 100 is controlled by engine ECU 200 having connected thereto a knock sensor 300, a water temperature sensor 302, a crank position sensor 306 arranged opposite a timing rotor 304, a throttle opening sensor 308, a vehicle speed sensor 310, and an ignition switch 312.

Knock sensor 300 is implemented by a piezoelectric element. As engine 100 vibrates, knock sensor 300 generates a voltage having a magnitude corresponding to that of the vibration. Knock sensor 300 transmits a signal representing the voltage to engine ECU 200. Water temperature sensor 302 detects temperature of refrigerant water in engine 100 at a water jacket and transmits a signal representing a resultant detection to engine ECU 200.

Timing rotor 304 is provided at a crank shaft 110 and rotates as crank shaft 110 does. Timing rotor 304 is circumferentially provided with a plurality of protrusions spaced as predetermined. Crank position sensor 306 is arranged opposite the protrusions of timing rotor 304. When timing rotor 304 rotates, an air gap between the protrusions of timing rotor 304 and crank position sensor 306 varies, and a coil portion of crank position sensor 306 passes an increased/decreased magnetic flux and thus experiences electromotive force. Crank position sensor 306 transmits a signal representing the electromotive force to engine ECU 200. From the signal, engine ECU 200 detects a crank angle.

Throttle opening sensor 308 detects a throttle opening and transmits a signal representing a resultant detection to engine ECU 200. Vehicle speed sensor 310 detects a rate of rotation of a wheel (not shown) and transmits a signal representing a resultant detection to engine ECU 200. From the wheel's rate of rotation engine ECU 200 calculates the vehicle's speed. Ignition switch 312 is turned on by a driver starting engine 100.

Engine ECU 200 uses the signals transmitted from each sensor and ignition switch 312 and a map and program stored in a memory 202 to perform an arithmetic operation to control equipment so that engine 100 has a desired driving condition.

In the present embodiment engine ECU 200 depends on a signal transmitted from knock sensor 300 and a crank angle to detect a waveform of a vibration of engine 100 at a predetermined knock detection gate (a section from a predetermined first crank angle to a predetermined second crank angle) (hereinafter such waveform of a vibration will also simply be referred to as "vibration waveform") and from the detected vibration waveform determines whether engine 100 knocks. The knock detection gate of the present embodiment is from the top dead center (0°) to 90° in a combustion process. It is noted that the knock detection gate is not limited thereto.

Figure 2:
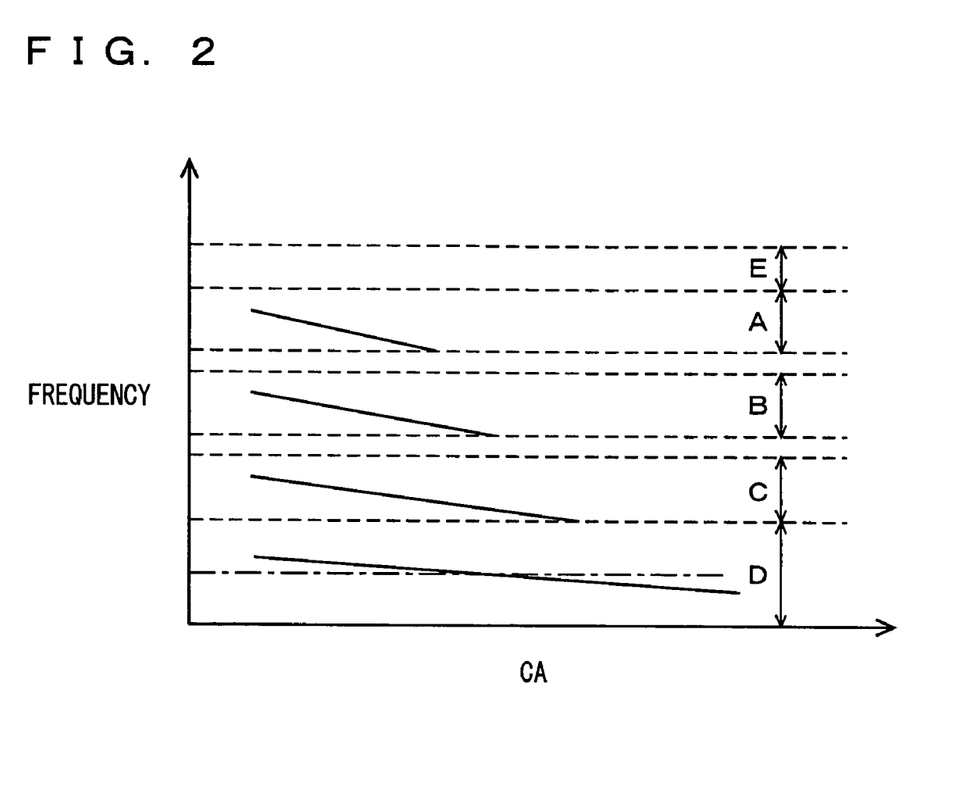
FIG. 2 is a diagram representing frequencies of vibrations occurring in the engine.

When engine 100 knocks, vibrations occur in engine 100 at frequencies around the frequencies represented by solid lines in FIG. 2. That is, when engine 100 knocks, the vibrations at frequencies included in a first frequency band A, a second frequency band B, a third frequency band C, and a fourth frequency band D occur. In FIG. 2, CA represents a crank angle. The number of frequency bands including the frequencies of a vibration attributed to knocking are not limited to four.

Of those frequency bands, fourth frequency band D includes a resonance frequency of engine 100 itself that is represented by an alternate-short-and-long dashed line in FIG. 2, which is present regardless of knocking.

Therefore, in the present embodiment, a vibration waveform is detected based on the magnitudes of the vibrations of first to third frequency bands A–C not including the resonance frequency. The number of frequency bands used in detecting the vibration waveform is not limited to three. The detected vibration waveform is compared with a knock waveform model, which will be described later.

The vibrations of engine 100 include a vibration not attributed to knocking but attributed to mechanical actuation of engine 100 itself. In detecting the vibration waveform attributed to knocking, noise is present in the vibration waveform affected by the vibration not attributed to knocking.

In order not to erroneously determine whether engine 100 knocks based on the vibration waveform that includes such noise, according to the present embodiment a vibration at a fifth frequency band E not including a vibration attributed knocking is detected. The vibration at the frequency included in fifth frequency band E may include a vibration attributed to actuation of intake valve 116 and exhaust valve 118 provided to a cylinder of engine 100, a pump (such as a high-pressure pump in an in-cylinder direct injection engine) 120 supplying fuel to an injector 104, and injector 104.

While in FIG. 2 fifth frequency band E is higher than first to fourth frequency bands A–D, it may be lower than first to fourth frequency bands A–D or may be a frequency band that is intermediate between adjacent frequency bands. Fifth frequency band E is narrower than other frequency bands. Thus, only the magnitude of the vibration not attributed to knocking can be detected in high precision.

Figure 3:
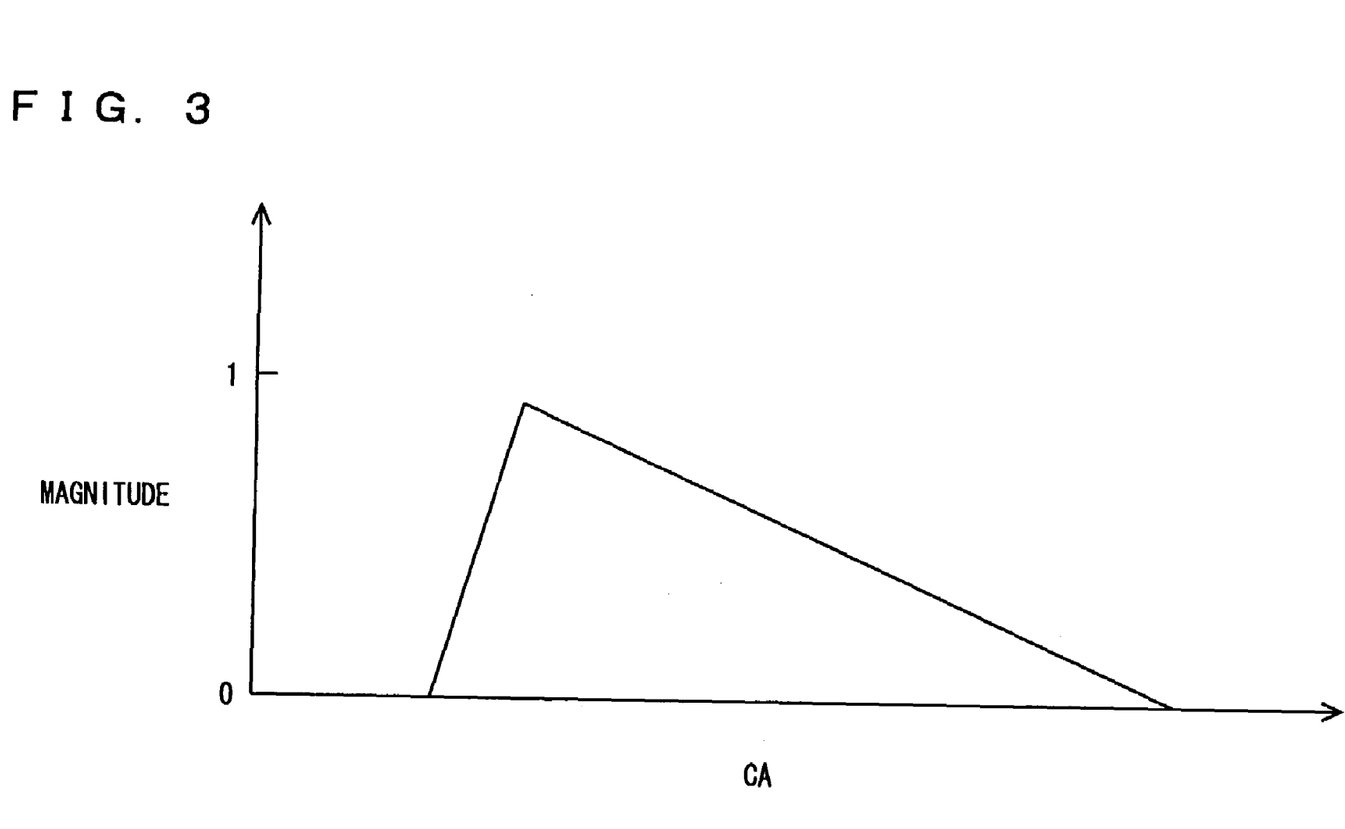
FIG. 3 is a diagram representing a knock waveform model stored in a memory of an engine ECU.

To determine whether the engine knocks, memory 202 of engine ECU 200 stores a knock waveform model corresponding to a model of a waveform of a vibration caused when engine 100 knocks, as shown in FIG. 3.

In the knock waveform model, a vibration's magnitude is represented by a dimensionless number of 0 to 1 and does not uniquely correspond to a crank angle. More specifically, for the present embodiment's knock waveform model, while it is determined that the vibration decreases in magnitude as the crank angle increases after a vibration's peak value in magnitude, the crank angle at which the vibration has the peak value in magnitude is not determined. Furthermore, the knock waveform model is a wave of a composition of vibrations of first to third frequency bands A–C.

The present embodiment's knock waveform model corresponds to a vibration attributed to knocking following the rise of the vibration. It should be noted that a knock waveform model corresponding to the portion of a vibration caused by knocking following the peak value in magnitude of the vibration may be stored.

The knock waveform model is obtained as follows: an experiment or the like is conducted to cause engine 100 to knock to detect the engine 100 vibration waveform, from which the knock waveform model is created and stored in advance. It should be noted, however, that the models may be created by a different method. Engine ECU 200 compares a detected waveform with the stored knock waveform model to determine whether engine 100 knocks.

Figure 4:
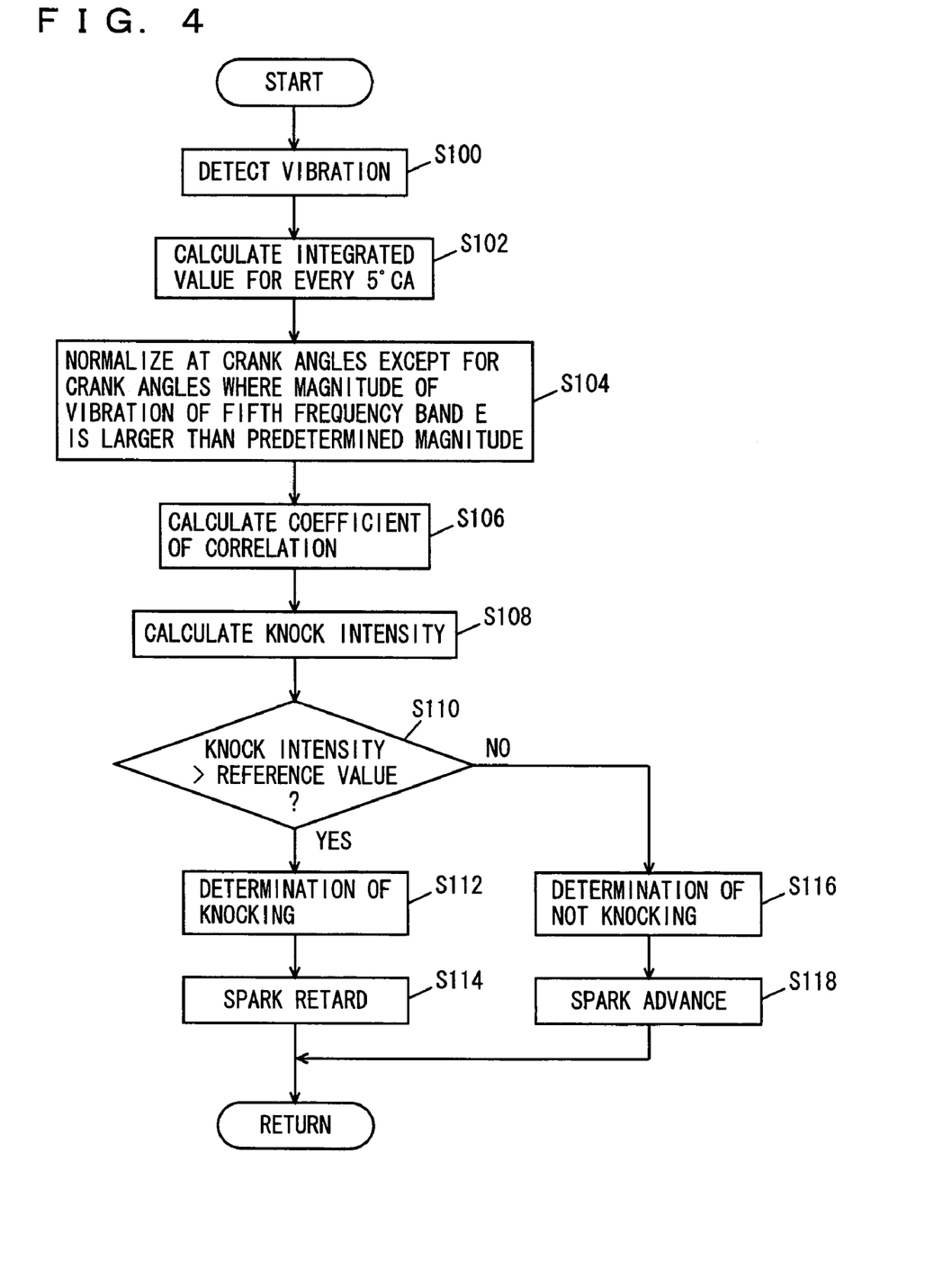
FIG. 4 is a flowchart for illustrating a control structure of a program executed by the engine ECU.

With reference to FIG. 4, a control structure of a program executed by engine ECU 200 in the present embodiment's knock determination device will be described hereinafter.

At step (hereinafter simply referred to as "S") 100 engine ECU 200 detects the magnitude of engine 100 vibration from a signal transmitted from knock sensor 300. The vibration's magnitude is represented by a value of voltage output from knock sensor 300. Note that the vibration's magnitude may be represented by a value corresponding to the value of the voltage output from knock sensor 300. The vibration's magnitude is detected in a combustion process for an angle from a top dead center to (a crank angle of) 90°.

At S102 engine ECU 200 calculates for a crank angle of every five degrees an integration (hereinafter also be referred to as an "integrated value") of values of voltage output from knock sensor 300 (i.e., representing magnitude of vibration). The integrated values are calculated for respective vibrations of first to third frequency bands A–C and for that of fifth frequency band E. Then, the integrated values of vibrations of first to third frequency bands A–C out of the calculated integrated values are composited together. Thus a vibration waveform of engine 100 is detected.

Figure 5:
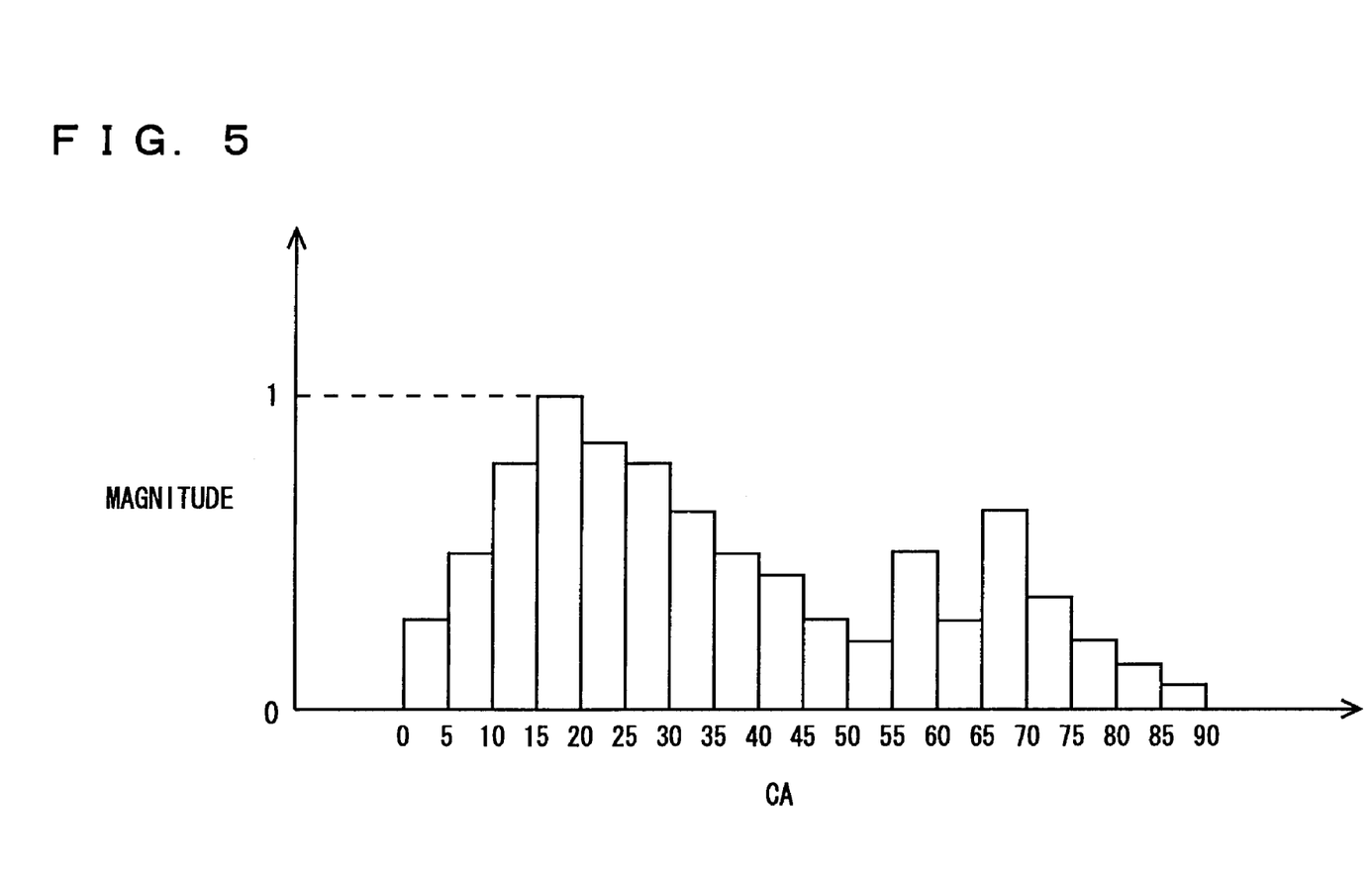
FIG. 5 is a diagram representing a vibration waveform after normalization.

At S104, engine ECU 200 normalizes the vibration waveform at crank angles except for the crank angles where the magnitude of the vibration of fifth frequency band E is larger than a predetermined magnitude. Herein, normalizing a waveform means dividing each integrated value by the largest of the integrated values in the detected waveform, for example, so that the vibration's magnitude is represented by a dimensionless number of 0 to 1, as shown in FIG. 5. It is noted that the value by which each integrated value is divided is not limited to the largest integrated value.

Referring back to FIG. 4, at S106 engine ECU 200 calculates a coefficient of correlation K, which is a value related to a deviation between the normalized vibration waveform and the knock waveform model. A timing of a normalized vibration waveform providing a vibration maximized in magnitude and that of a knock waveform model providing a vibration maximized in magnitude are matched, while a deviation in absolute value (or an amount of offset) between the normalized vibration waveform and the knock waveform model is calculated for each crank angle (of five degrees) to calculate the coefficient of correlation K.

If the normalized vibration waveform and the knock waveform model provide a deviation $\Delta S$ (I) (wherein I is a natural number) in absolute value for each crank angle and the knock waveform model's vibration as represented in magnitude integrated by the crank angle (i.e., the knock waveform model's area) is represented by S, then the coefficient of correlation K is calculated by an equation $K=(S-\Sigma\Delta S(I))/S$, wherein $\Sigma\Delta S$ (I) represents a sum of $\Delta S$ (I)s for the top dead center to 90°. Here, data of crank angles where the magnitude of the vibration of fifth frequency band E is larger than a predetermined magnitude is ignored. Note that the coefficient of correlation K may be calculated by a different method.

At S108 engine ECU 200 calculates a knock intensity N. If calculated integrated values have a largest value P and engine 100 does not knock and vibrates with a magnitude represented in value by a background level (BGL), then knock intensity N is calculated by an equation $N=P\times K/BGL$. The BGL is stored in memory 202. Here, data of crank angles where the magnitude of the vibration of fifth frequency band E is larger than a predetermined magnitude is ignored. Note that knock intensity N may be calculated by a different method.

At S110 engine ECU 200 determines whether knock intensity N is larger than a predetermined reference value. If so (YES at S110) the control proceeds with S112, otherwise (NO at S110) the control proceeds with S116.

At S112 engine ECU 200 determines that engine 100 knocks. At S114 engine ECU 200 introduces a spark retard. At S116 engine ECU 200 determines that engine 100 does not knock. At S118 engine ECU 200 introduces a spark advance.

An operation of engine ECU 200 of the knock determination device according to the present embodiment based on the above-described configuration and flowchart will be described.

When a driver turns on ignition switch 312 and engine 100 starts, the engine 100 vibration is detected in magnitude from a signal transmitted from knock sensor 300 (S100).

In a combustion process for a range from the top dead center to 90° an integrated value for every five degrees is calculated for respective vibrations of first to third frequency bands A–C and for that of fifth frequency band E (S102). Then, the integrated values of the vibrations of first to third frequency bands A–C out of the calculated integrated values are composited together. Thus, as shown in FIG. 6, the engine 100 vibration waveform is detected as a wave of a composition of the vibrations of first to third frequency bands A–C, and a waveform of a vibration not attributed to knocking is detected as a waveform of a vibration of fifth frequency band E.

Figure 6:
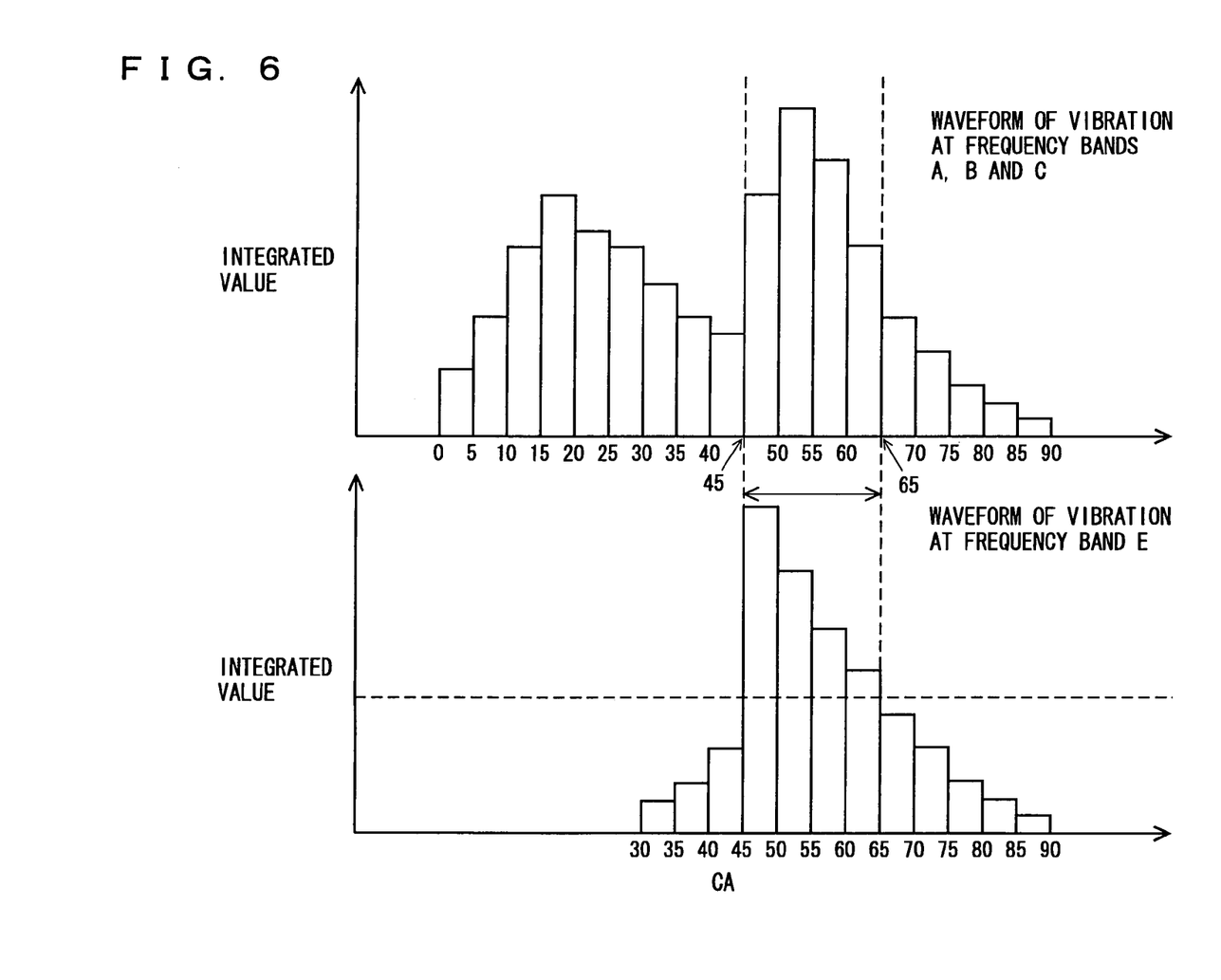
FIG. 6 is a diagram representing a vibration waveform before normalization.

Note that while FIG. 6 represents a vibration waveform in a rectangle, each integrated value may be connected by a line to represent the vibration waveform. Furthermore, each integrated value alone may be represented in a dot to represent the vibration waveform.

As an integrated value for every five degrees is used to detect a vibration waveform it becomes possible to detect a vibration waveform of which delicate variation are suppressed. This makes it easier to compare a detected vibration waveform with a knock waveform model.

Herein, it is assumed that the integrated values for 45°–65° crank angles of the vibration (the magnitude of the vibration) at fifth frequency band E is greater than a predetermined integrated value (magnitude) represented by a dashed line. In this case, for 45°–65° crank angles, vibration waveforms of first to third frequency bands A–C may include high proportions of noise.

If knocking is determined based on a vibration waveform including a high proportion of noise, it is likely that an erroneous determination result is provided. Therefore, it is necessary to suppress the effect of noise included in a vibration waveform. To this end, except for crank angles where the magnitude of the vibration at fifth frequency band E is larger than a predetermined magnitude, i.e., except for crank angles 45°–65°, each integrated value is divided by the largest of the integrated values to normalize the vibration waveform (S104).

Herein, it is assumed that each integrated value is divided by the integrated value for 15°–20° to normalize the vibration waveform. By the normalization, a vibration's magnitude in the vibration waveform is represented by a dimensionless number of 0 to 1. Thus, the detected vibration waveform can be compared with the knock waveform model regardless of the vibration's magnitude. This can eliminate the necessity of storing a large number of knock waveform models corresponding to the magnitude of vibration and thus help to create a knock waveform model.

Figure 7:
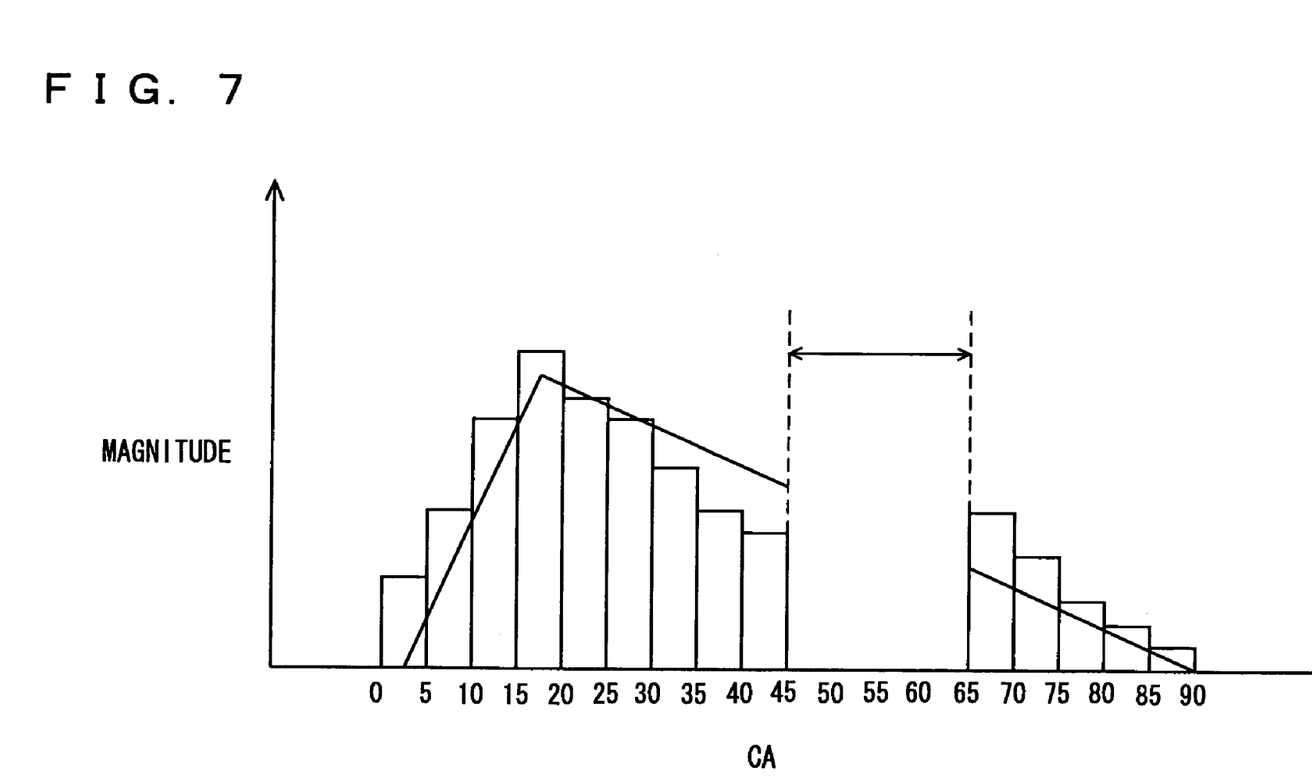
FIG. 7 is a diagram representing timings for comparing the normalized vibration waveform with the knock waveform model.

As shown in FIG. 7, a timing of a normalized vibration waveform providing a vibration maximized in magnitude and that of a knock waveform model providing a vibration maximized in magnitude are matched, while a deviation in absolute value $\Delta S$ (I) between the normalized vibration waveform and the knock waveform model is calculated for each crank angle. Sum $\Sigma\Delta S$ (I) of such $\Delta S$ (I)s and value S representing a magnitude of vibration in knock waveform model that is integrated by crank angle are used to calculate the coefficient of correlation $K=(S-\Sigma\Delta S(I))/S$ (S106). This allows a degree of matching of a detected vibration waveform and a knock waveform model to be numerically represented and thus objectively determined.

Herein, for 45°–65°, i.e., for the crank angles where magnitude of the vibration at fifth frequency band E is greater than a predetermined magnitude, a deviation between the vibration waveform and the knock waveform model is not calculated. This can prevent coefficient of correlation K from being calculated based on a vibration waveform that may include a high proportion of noise. Thus, the effect of the noise included in the vibration waveform can be suppressed.

The product of the calculated coefficient of correlation K and the largest integrated value P is divided by the BGL to calculate knock intensity N (S108). Thus, in addition to the degree of matching between the detected vibration waveform and the knock waveform model, vibration's magnitude can also be depended on to analyze in more detail whether the engine 100 vibration is attributed to knocking. Here, it is assumed that the product of coefficient of correlation K and the integrated value for 15°–20° is divided by BGL to calculate knock intensity K.

If knock intensity N is larger than a predetermined reference value (YES at S100) a determination is made that engine knocks (S112) and a spark retard is introduced (S114) to prevent the engine from knocking.

If knock intensity N is not larger than the predetermined reference value (NO at S110), a determination is made that the engine does not knock (S116) and a spark advance is introduced (S118).

Thus, in the present embodiment's knock determination device, the engine ECU detects a waveform of a vibration attributed to knocking, based on a signal transmitted from a knock sensor. It compares the vibration waveform with the knock vibration model at crank angles except for the crank angles where the magnitude of the vibration not attributed to knocking is larger than a predetermined magnitude to calculate coefficient of correlation K. The product of coefficient of correlation K and the largest integrated value P in the vibration waveform is divided by BGL to calculate knock intensity N. If knock intensity N is larger than a reference value, a determination is made that the engine knocks. If knock intensity N is not larger than the reference value, a determination is made that the engine does not knock. Thus, whether the engine knocks can be determined while suppressing the effect of noise that may be included in the vibration waveform. This can prevent the engine from being erroneously determined as knocking due to the presence of great noise of a vibration not attributed to knocking, despite the engine not knocking. Furthermore, this can also prevent the engine from being erroneously determined as not knocking despite the engine knocking, based on a fact that a vibration greater in magnitude than a vibration attributed to knocking has occurred at a timing different from the vibration attributed to knocking. Thus, whether the engine knocks or not can be determined with high precision.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knock determination device for an internal combustion engine, comprising:
    means for detecting a magnitude of a vibration of said internal combustion engine at a first frequency band;
    means for detecting a magnitude of a vibration of said internal combustion engine at a second frequency band that is different from said first frequency band;
    crank angle detecting means for detecting a crank angle of said internal combustion engine;
    waveform detecting means for detecting a waveform of a vibration of said internal combustion engine at predetermined crank angle intervals as based on the magnitude of the vibration at said first frequency band;
    storing means for storing in advance a waveform of a vibration of said internal combustion engine; and
    determining means for determining whether said internal combustion engine knocks, as based on a result of comparing the detected waveform with the stored waveform as well as on the magnitude of the vibration at said second frequency band.

2. The knock determination device for an internal combustion engine according to claim 1, wherein
    said determining means includes means for determining whether said internal combustion engine knocks, as based on a result of comparing the detected waveform with the stored waveform at a timing where the magnitude of the vibration at said second frequency band is smaller than a predetermined magnitude.

3. The knock determination device for an internal combustion engine according to claim 1, wherein
    said first frequency band is a frequency band of a vibration attributed to knocking, and said second frequency band is a frequency band of a vibration not attributed to knocking.

4. The knock determination device for an internal combustion engine according to claim 1, wherein
    said first frequency band does not include a resonance frequency of said internal combustion engine.

5. The knock determination device for an internal combustion engine according to claim 1, wherein
    said second frequency band is narrower than said first frequency band.

6. The knock determination device for an internal combustion engine according to claim 1, wherein
    said second frequency band is a frequency band of a vibration attributed to actuation of an intake valve and an exhaust valve provided to a cylinder of said internal combustion engine.

7. The knock determination device for an internal combustion engine according to claim 1, wherein
    said second frequency band is a frequency band of a vibration attributed to actuation of a pump supplying fuel to an injector provided to said internal combustion engine.

8. The knock determination device for an internal combustion engine according to claim 1, wherein
    said second frequency band is a frequency band of a vibration attributed to actuation of an injector provided to said internal combustion engine.

9. A knock determination device for an internal combustion engine, comprising:
    a first magnitude detector detecting a magnitude of a vibration of said internal combustion engine at a first frequency band;
    a second magnitude detector detecting a magnitude of a vibration of said internal combustion engine at a second frequency band that is different from said first frequency band;
    a crank angle detector detecting a crank angle of said internal combustion engine;
    a waveform detector detecting a waveform of a vibration of said internal combustion engine at predetermined crank angle intervals as based on the magnitude of the vibration at said first frequency band;
    a storage storing in advance a waveform of a vibration of said internal combustion engine; and
    a determiner determining whether said internal combustion engine knocks, as based on a result of comparing the detected waveform with the stored waveform as well as on the magnitude of the vibration at said second frequency band.

10. The knock determination device for an internal combustion engine according to claim 9, wherein
    said determiner determines whether said internal combustion engine knocks, as based on a result of comparing the detected waveform with the stored waveform at a timing where the magnitude of the vibration at said second frequency band is smaller than a predetermined magnitude.

11. The knock determination device for an internal combustion engine according to claim 9, wherein
    said first frequency band is a frequency band of a vibration attributed to knocking, and said second frequency band is a frequency band of a vibration not attributed to knocking.

12. The knock determination device for an internal combustion engine according to claim 9, wherein said first frequency band does not include a resonance frequency of said internal combustion engine.

13. The knock determination device for an internal combustion engine according to claim 9, wherein
said second frequency band is narrower than said first frequency band.

14. The knock determination device for an internal combustion engine according to claim 9, wherein
said second frequency band is a frequency band of a vibration attributed to actuation of an intake valve and an exhaust valve provided to a cylinder of said internal combustion engine.

15. The knock determination device for an internal combustion engine according to claim 9, wherein
said second frequency band is a frequency band of a vibration attributed to actuation of a pump supplying fuel to an injector provided to said internal combustion engine.

16. The knock determination device for an internal combustion engine according to claim 9, wherein said second frequency band is a frequency band of a vibration attributed to actuation of an injector provided to said internal combustion engine.

* * * * *